United States Patent
Sutardja

(10) Patent No.: US 7,514,911 B2
(45) Date of Patent: Apr. 7, 2009

(54) VOLTAGE REGULATOR FEEDBACK PROTECTION METHOD AND APPARATUS

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 644 days.

(21) Appl. No.: 10/846,717

(22) Filed: May 13, 2004

(65) Prior Publication Data

US 2005/0253566 A1    Nov. 17, 2005

(51) Int. Cl.
  *G05F 1/56*    (2006.01)
(52) U.S. Cl. .................... 323/285; 323/269; 363/65
(58) Field of Classification Search ......... 323/282–288, 323/312, 313; 363/20, 21.1, 97, 131; 307/64–66, 307/47
See application file for complete search history.

(56) References Cited

U.S. PATENT DOCUMENTS

| | | | |
|---|---|---|---|
| 4,621,313 A * | 11/1986 | Kiteley | .......................... 363/49 |
| 5,204,809 A | 4/1993 | Andresen | |
| 5,289,045 A * | 2/1994 | Lavin et al. | .................... 307/64 |
| 5,508,603 A | 4/1996 | Strong, III et al. | |
| 5,530,636 A | 6/1996 | Brown et al. | |
| 5,672,958 A | 9/1997 | Brown et al. | |
| 5,867,013 A * | 2/1999 | Yu | .............................. 323/314 |
| 5,977,757 A | 11/1999 | Felps | |
| 6,301,133 B1 | 10/2001 | Cuadra et al. | |
| 6,362,986 B1 | 3/2002 | Schultz et al. | |
| 2003/0193244 A1 | 10/2003 | Dodson, III | |
| 2004/0039423 A1 | 2/2004 | Dolgin | |
| 2004/0075488 A1 | 4/2004 | Yamamoto et al. | |

FOREIGN PATENT DOCUMENTS

| | | |
|---|---|---|
| EP | 0 823 681 | 2/1998 |
| JP | 2003 124564 | 4/2003 |

OTHER PUBLICATIONS

Communication dated Oct. 8, 2005 for the European Search Report for Application No. 05011612.8-2206 PCT.
Robert Bell; "Crossing the Boundary: Strategies for Feedback Across An Isolation Barrier," E.D.N./WWW.EDNMAG.COM, May 30, 2002, 4 pages.

(Continued)

*Primary Examiner*—Rajnikant B Patel

(57) ABSTRACT

An integrated circuit comprising a feedback terminal to receive a feedback signal. A voltage regulator has a feedback input to receive the feedback signal from the feedback terminal. The voltage regulator has a power output in communication with an output terminal. The voltage regulator being responsive to the feedback signal, to generate the power output. A voltage generator to generate a pull-up voltage having an amplitude greater than a DC voltage amplitude of the power output. The pull-up voltage being derived separately from the power output. A pull-up resistor in communication with the pull-up generator and the feedback input of the voltage regulator.

64 Claims, 2 Drawing Sheets

OTHER PUBLICATIONS

Official Communication from the European Patent Office dated Feb. 20, 2007 for Application No. 05 008 414.4-2206; 5 pages.

Official Communication from the European Patent Office dated Feb. 19, 2007 for Application No. 05 011 613.6-2206; 5 pages.

Official Communication from the European Patent Office dated Feb. 19, 2007 for Application No. 05 011 612.8-2206; 4 pages.

Feb. 14, 2008 Preliminary Report on an Official Communication of Feb. 6, 2008, European Patent Application No. 05 011 612.8-2206 (7 pgs).

Feb. 19, 2008 Preliminary Report on an Official Communication of Feb. 6, 2008; European Patent Application No. 05 011 613.6-2206 (7 pgs).

* cited by examiner

VOLTAGE REGULATOR FEEDBACK PROTECTION METHOD AND APPARATUS

TECHNICAL FIELD

An aspect of this invention relates to power systems for electronic circuits.

BACKGROUND

Most modern electronic systems are powered by one or more voltage regulators that provide regulated output power to the system. A typical voltage regulator includes a feedback signal extending from the power input to the system back to the DC/DC converter. The feedback signal is used in the voltage regulator to regulate the output power at the input to the system, thereby reducing error in the regulated output that might be caused by conduction losses between the voltage regulator and the system.

FIG. 1 shows a typical conventional feedback system used with a voltage regulator 12 and electronic system 14. An integrated circuit 16 may include the voltage regulator 12 and connect via a pin 17 to external filter components such as an output inductor 18 and output capacitor 20. A feedback signal 22 from the regulated output, Vout, may connect to the voltage regulator via a pin 19. The feedback signal 22 is typically received from a junction of the output inductor 18 and the output capacitor 20 so that gain and phase associated with the filter components is included within the control loop of the voltage regulator 12. The feedback signal may additionally be obtained from a point nearer to the input to the electronic system 14 to minimize the error caused by parasitic effects such as conduction losses and leakage inductance.

Although, sensing the junction of the filter components to generate the feedback signal may improve the stability and accuracy of the regulated output of the voltage regulator 12, if the line carrying the feedback signal becomes electrically degraded, the regulated output may drift outside of the regulation limits causing the voltage regulator 12 to shutdown.

SUMMARY

An integrated circuit comprising a feedback terminal to receive a feedback signal. A voltage regulator has a feedback input to receive the feedback signal from the feedback terminal. The voltage regulator has a power output in communication with an output terminal. The voltage regulator being responsive to the feedback signal, to generate the power output. A voltage generator to generate a pull-up voltage having an amplitude greater than a DC voltage amplitude of the power output. The pull-up voltage being derived separately from the power output. A pull-up resistor in communication with the pull-up generator and the feedback input of the voltage regulator.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
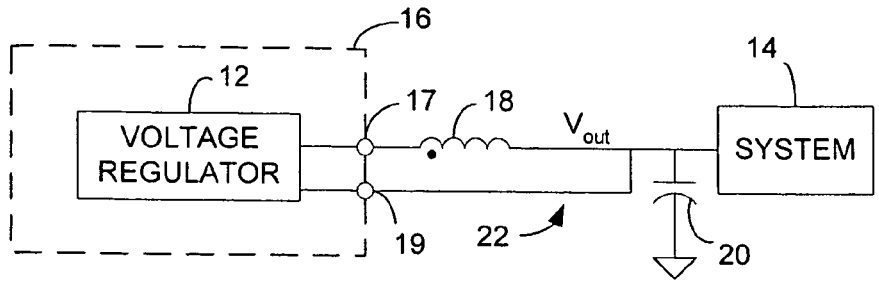
FIG. 1 is a block diagram of an aspect of a conventional power supply feedback system.
Figure 2:
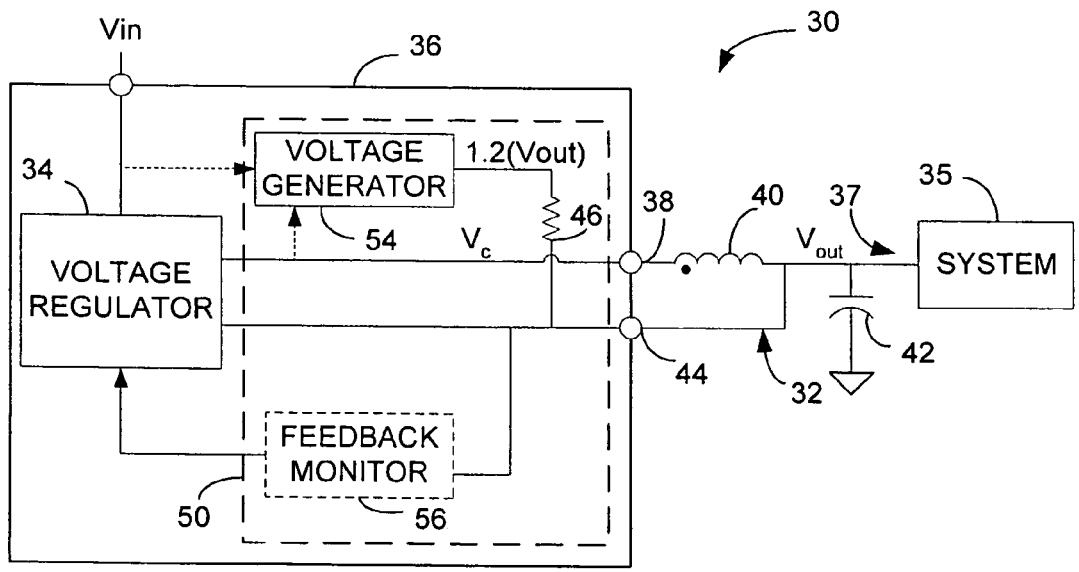
FIG. 2 is a block diagram of a power distribution system that includes an aspect of a feedback protection system.

FIG. 2 shows a block diagram of an aspect of a power distribution system 30 for supplying a regulated output voltage, Vout, to a system 35 such as an electronic system. The power distribution system 30 includes a feedback protection system 50 to protect the power distribution system 30 from the potential effects of a feedback line 32 that is electrically degraded from normal operation, wherein electrically degraded is defined as having an increased impedance that causes a feedback signal on the feedback line 32 to be of insufficient quality for the control loop of the power distribution system 30 to control the regulated output voltage. The increased impedance of the feedback line 32 may be due to any cause such as a cold solder joint, the feedback line 32 being partially disconnected from the regulated output voltage, and the feedback line 32 being completely disconnected from the regulated output voltage.

A voltage regulator 34 may generate the regulated output voltage, Vout, from an input voltage, Vin, and supply that regulated output voltage to the system 35. The voltage regulator 34 may be any type of voltage regulator such as switching regulators and linear regulators. An integrated circuit 36 may include the voltage regulator 34 and connect via one or more output terminals 38 to external filter components such as an output inductor 40 and output capacitor 42. Any type of terminals may be used for the output terminals 38 such as pins, ball grid arrays, and connectors. The voltage regulator 34 may generate a power output, Vc, that is filtered by the external filter components to generate Vout. The power output, Vc, may be any type of power output to be used for powering the system 35 such as a chopped output of a switching regulator that is filtered by the external filter components, and a DC output from either a switching regulator or a linear regulator.

The feedback line 32 may connect from the regulated output, Vout, to the voltage regulator via one or more feedback terminals 44. Any type of terminals may be used for the feedback terminals 44 such as pins, ball grid arrays, and connectors. A feedback signal carried on the feedback line 32 may be sensed at a junction of the output inductor 40 and the output capacitor 42 such as near an input 37 to the system 35.

The integrated circuit 36 may include a feedback protection system to protect the system 35 if the feedback line 32 is electrically degraded. In another aspect, the feedback protection system 50 may monitor the feedback line 32 and detect if feedback line 32 is electrically degraded. The feedback protection system 50 may include a pull-up resistor 46 connected between the feedback line 32 and a pull-up voltage. The pull-up resistor 46 may apply the pull-up voltage through the relatively high impedance of the pull-up resistor 46 to the feedback line 32. The pull-up resistor 46 advantageously causes the output voltage to decrease if the feedback line 32 is electrically degraded.

In one aspect, when the feedback line 32 is electrically degraded, a voltage that is greater than Vout is applied through the pull-up resistor 46 to the voltage regulator 34 causing the control loop of the voltage regulator 32 to reduce the conduction time of the converter 32 leading to a decrease in the output voltage. Conventional DC/DC converters that have a disconnected feedback line is electrically degraded, typically generate a greater output voltage that may cause an overvoltage circuit to trigger, leading to shutdown of the converter. The feedback protection circuit 50 may advantageously operate if the feedback line 32 is electrically degraded to cause the control loop of the voltage regulator 32 to decrease the output voltage instead of relying on a overvoltage protection circuit. In addition, the feedback protection circuit 50 may cause the output voltage to decrease without first increasing.

In another aspect, if the feedback line 32 is electrically degraded from the integrated circuit 36 the pull-up voltage that is applied through the pull-up resistor 46 is high enough to cause the overvoltage circuit in the voltage regulator 34 to trigger an overvoltage shutdown of the voltage regulator 34 causing the output voltage to decrease to approximately zero volts. Although the overvoltage circuit operates to shutdown the voltage regulator 34 if the feedback line 32 is electrically degraded, the output voltage does not initially increase, but instead initially decreases. Although the shutdown circuit eventually causes the voltage regulator 34 to shutdown, the initial decrease in the output voltage may be due to operation of either the control loop or the overprotection circuit depending on their relative speed of operation.

The pull-up resistor 46 may be any suitable resistance to pull-up the feedback line 32 to approximately the pull-up voltage if the feedback line 32 is electrically degraded. Exemplary values of the resistance may range from approximately 100 ohms to 1 Meg ohms, although the resistance may be greater than or less than this range depending on several design factors such as the differential between the pull-up voltage and the output voltage, and the impedance of interface circuits that connect to the pull-up resistor 46. Although only a single pull-up resistor 46 is shown, another pull-up resistor may be coupled to a feedback return line if differential feedback sensing is employed.

A voltage generator 54 may generate the pull-up voltage that is applied to the pull-up resistor 46. The pull-up voltage may be any voltage that is greater than Vout such as a voltage that is approximately 20% greater than Vout. Any energy source may be used for generating the pull-up voltage such as the input voltage, Vin, and voltages from the voltage regulator 34.

A feedback monitor 56 may monitor the feedback line 32 within the integrated circuit 50 to detect if the portion of the feedback line 32 extending from the regulated output voltage through the feedback terminal 44 is electrically degraded. The feedback monitor 56 may communicate a feedback degraded signal to the voltage regulator 34 to indicate that the feedback line 32 has an increased impedance. In one aspect, the feedback monitor 56 may compare the voltage on a portion of the feedback line 32 internal to the integrated circuit 36 to a reference voltage to determine if the feedback line 32 is electrically degraded.

Figure 3:
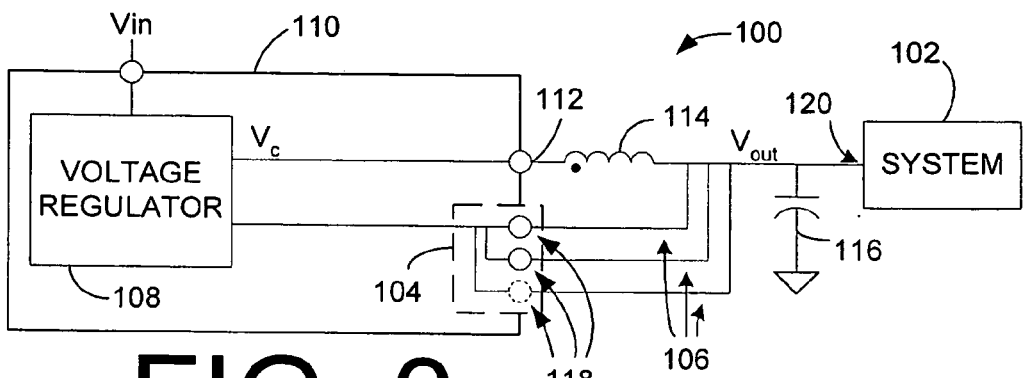
FIG. 3 is a block diagram of a power distribution system that includes another aspect of a feedback protection system.

FIG. 3 shows an aspect of a power distribution system 100 for supplying a regulated output voltage, Vout, to a system 102 such as an electronic system. The power distribution system 100 includes a feedback protection system 104 to protect the power distribution system 100 from the potential effects of a feedback line 106 that is electrically degraded from normal operation, wherein electrically degraded is defined as having an increased impedance that causes a feedback signal on the feedback line 106 to be of insufficient quality for the control loop of the power distribution system 100 to control the regulated output voltage. The increased impedance of the feedback line 106 may be due to any cause such as a cold solder joint, the feedback line 106 being partially disconnected from the regulated output voltage, and the feedback line 106 being completely disconnected from the regulated output voltage.

A voltage regulator 108 may generate the regulated output voltage, Vout, from an input voltage, Vin, and supply that regulated output voltage to the system 102. The voltage regulator 108 may be any type of voltage regulator such as switching regulators and linear regulators. An integrated circuit 110 may include the voltage regulator 108 and connect via one or more output terminals 112 to external filter components such as an output inductor 114 and output capacitor 116. The voltage regulator 108 may generate a power output, Vc, that is filtered by the external filter components to generate Vout. The power output, Vc, may be any type of power output to be used for powering the system 35 such as a chopped output of a switching regulator that is filtered by the external filter components, and a DC output from either a switching regulator or a linear regulator.

Multiple feedback lines 106 may connect from the regulated output, Vout, to the voltage regulator via two or more feedback terminals 118. A feedback signal carried on the feedback lines 106 may be sensed at a junction of the output inductor 114 and the output capacitor 116 such as near an input 120 to the system 102. The feedback protection system 104 may comprise the feedback terminals 118 and interconnection of the feedback terminals 118 within the integrated circuit 110. The feedback protection system 104 advantageously provides redundant feedback lines 106 and feedback terminals 118 to prevent the electrical degradation of any one of the feedback lines from affecting the operation of the voltage regulator 108. For example, if there is a cold solder joint at one of the feedback terminals 118 causing the impedance of the associated feedback line 106 to increase, the other feedback line(s) 106 and feedback pin(s) 106 provide a redundant low impedance path for the feedback signal.

Figure 4:
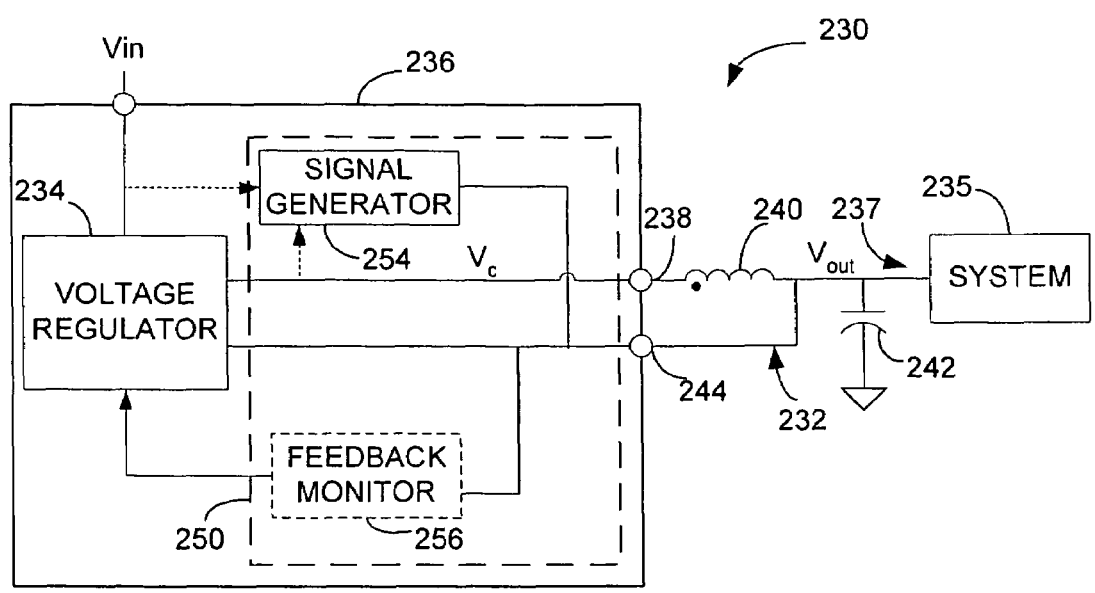
FIG. 4 is a block diagram of a power distribution system that includes another aspect of a feedback protection system.

FIG. 4 shows an aspect of another power distribution system 230 for supplying a regulated output voltage, Vout, to a system 235 such as an electronic system. The power distribution system 230 is similar to power distribution system 30 in function with corresponding elements numbered in the range 230-260, except that the power distribution system 230 includes a signal generator 254 instead of the voltage generator 54 and the pull-up resistor 46.

The signal generator 254 may be any type of high impedance signal generator such as a current generator, and a voltage generator with a series resistor. The output impedance of the signal generator may be selected to be sufficiently high to not load down the source of the feedback signal. For example, if the feedback signal is derived from an inductor-capacitor filter such as inductor 240 and capacitor 242 the source impedance of the inductor-capacitor filter is very low, being approximately 0 ohms, therefore the output impedance may be any impedance greater than approximately 10 ohms.

The signal generator 254 may be any type of source including an alternating current (AC) source and a direct current (DC) source. In one aspect, when the signal generator 254 is an AC source, a tone detector may monitor the feedback input of the voltage regulator 234 to detect an AC signal from the AC source, which indicates a degraded electrical condition of the feedback line 232 and feedback terminal 244. In one aspect, the feedback monitor 256 may comprise the tone detector.

A number of embodiments of the invention have been described. Nevertheless, it will be understood that various modifications may be made without departing from the spirit and scope of the invention. Accordingly, other embodiments are within the scope of the following claims.

What is claimed is:

1. An integrated circuit comprising;
an output terminal;
a feedback terminal to receive a feedback signal;
a voltage regulator having a feedback input to receive the feedback signal from the feedback terminal;
the voltage regulator having a power output in communication with the output terminal, the voltage regulator being responsive to the feedback signal, to generate and regulate the power output to an output voltage;
a voltage generator to generate a pull-up voltage having an amplitude greater than a DC voltage amplitude of the output voltage, the pull-up voltage being derived separately from the power output; and
a pull-up resistor coupling the pull-up voltage to the feedback input of the voltage regulator.

2. The integrated circuit of claim 1 wherein the pull-up voltage is approximately 120% of the DC voltage amplitude of the power output.

3. The integrated circuit of claim 1 further comprising a filter to generate a regulated output voltage from the power output; and
wherein the feedback signal is derived from the regulated output voltage.

4. The integrated circuit of claim 3 included in a power distribution system comprising a feedback line to conduct the feedback signal from the regulated output voltage to the feedback terminal.

5. The integrated circuit of claim 1 included in a power distribution system comprising external filter components coupled to the output terminal;
the external filter components comprising an output inductor and an output capacitor to filter the power output to generate a regulated output voltage.

6. The integrated circuit of claim 1 wherein the pull-up resistor has an impedance in a range of approximately 100 ohms to 1,000,000 ohms.

7. The integrated circuit of claim 1 wherein the voltage regular is selected from a group consisting of a switching regulator and a linear regulator.

8. The integrated circuit of claim 1 wherein the output terminal is selected from a group consisting of a pin, a ball grid any, and a connector.

9. The integrated circuit of claim 1 wherein the feedback terminal is selected from a group consisting of a pin, a ball grid any, and a connector.

10. The integrated circuit of claim 4 further comprising a feedback monitor to detect an electrically degraded connection between the feedback terminal and the regulated output voltage.

11. The integrated circuit of claim 10 wherein the power output has an amplitude; and
wherein the electrically degraded connection is defined as having an increased impedance that causes the feedback signal to be of insufficient quality for the voltage regulator to control the amplitude of the power output.

12. The integrated circuit of claim 10 wherein the electrically degraded connection is selected from a group consisting of a cold solder joint, the feedback line being partially disconnected from the regulated output voltage, and the feedback line being completely disconnected from the regulated output voltage.

13. The integrated circuit of claim 10 wherein the feedback monitor compares a voltage on the feedback terminal to a reference voltage to detect the electrically degraded connection.

14. The integrated circuit of claim 1 wherein the integrated circuit further comprises at least two feedback terminals to each receive the feedback signal.

15. The integrated circuit of claim 14 included in a power distribution system comprising;
a filter to generate a regulated output voltage from the power output; and
redundant feedback lines coupled between the regulated output voltage and the at least two feedback terminals of the integrated circuit to conduct the feedback signal.

16. The integrated circuit of claim 14 further comprising an interconnection circuit to interconnect the feedback terminals.

17. An integrated circuit comprising;
output terminal means;
feedback terminal means to receive a feedback signal;
means for voltage regulating having a feedback input to receive the feedback signal from the feedback terminal means;
the voltage regulating means having a power output in communication with the output terminal means, the voltage regulating means being responsive to the feedback signal, to generate and regulate the power output to an output voltage;
means for voltage generating to generate a pull-up voltage having an amplitude greater than a DC voltage amplitude of the output voltage, the pull-up voltage being derived separately from the power output; and
a pull-up resistor coupling the pull-up voltage to the feedback input of the voltage regulating means.

18. The integrated circuit of claim 17 wherein the pull-up voltage is approximately 120% of the DC voltage amplitude of the power output.

19. The integrated circuit of claim 17 further comprising a means for filtering to generate a regulated output voltage from the power output; and
wherein the feedback signal is derived from the regulated output voltage.

20. The integrated circuit of claim 19 included in a power distribution system comprising first means for conducting to conduct the feedback signal from the regulated output voltage to the feedback terminal means.

21. The integrated circuit of claim 17 included in a power distribution system comprising means for external filtering coupled to the output terminal means;
the external filtering means comprising an output inductor and an output capacitor to filter the power output to generate a regulated output voltage.

22. The integrated circuit of claim 17 wherein the pull-up resistor has an impedance in a range of approximately 100 ohms to 1,000,000 ohms.

23. The integrated circuit of claim 17 wherein the voltage regulating means is selected from a group consisting of a switching regulator and a linear regulator.

24. The integrated circuit of claim 17 wherein the output terminal means is selected from a group consisting of a pin, a ball grid array, and a connector.

25. The integrated circuit of claim 17 wherein the feedback terminal means is selected from a group consisting of a pin, a ball grid array, and a connector.

26. The integrated circuit of claim 20 further comprising means for feedback monitoring to detect an electrically degraded connection between the feedback terminal means and the regulated output voltage.

27. The integrated circuit of claim 26 wherein the power output has an amplitude; and wherein the electrically degraded connection is defined as having an increased impedance that causes the feedback signal to be of insufficient quality for the voltage regulating means to control the amplitude of the power output.

28. The integrated circuit of claim 27 wherein the electrically degraded connection is selected from a group consisting of a cold solder joint, the feedback conducting means being partially disconnected from the regulated output voltage, and the feedback conducting means being completely disconnected from the regulated output voltage.

29. The integrated circuit of claim 26 wherein the feedback monitoring means compares a voltage on the feedback terminal means to a reference voltage to detect the electrically degraded connection.

30. The integrated circuit of claim 17 wherein the integrated circuit further comprises at least two feedback terminal means to each receive the feedback signal.

31. The integrated circuit of claim 30 included in a power distribution system comprising;
   means for filtering to generate a regulated output voltage from the power output; and
   redundant feedback conduction means coupled between the regulated output voltage and the at least two feedback terminal means of the integrated circuit to conduct the feedback signal.

32. The integrated circuit of claim 30 further comprising an interconnection circuit means to interconnect the at least two feedback terminal means.

33. A method of protecting a power distribution system, comprising;
   providing an integrated circuit comprising a voltage regulator, the integrated circuit having an output terminal and a feedback terminal;
   at the feedback terminal, receiving a feedback signal;
   coupling the feedback signal to a feedback input of the voltage regulator;
   generating a power output from the voltage regulator in response to the feedback signal;
   sending the power output to the output terminal;
   generating a pull-up signal;
   coupling the pull-up signal through a high impedance to the feedback input of the voltage regulator such that if an electrically degraded connection prevents the feedback signal from being received by the feedback input, then the pull-up signal is applied to the feedback input, and
   decreases voltage of the power output based on the pull-up signal.

34. The method of claim 33 wherein the pull-up signal is a pull-up voltage that is approximately 120% of the DC voltage amplitude of the power output.

35. The method of claim 33 further comprising filtering the power output to generate a regulated output voltage; and
   deriving the feedback signal from the regulated output voltage.

36. The method of claim 35 further comprising conducting the feedback signal through a feedback conductor from the regulated output voltage to the feedback terminal.

37. The method of claim 33 wherein the high impedance has an impedance in a range of approximately 100 ohms to 1,000,000 ohms.

38. The method of claim 17 wherein the voltage regulator is selected from a group consisting of a switching regulator and a linear regulator.

39. The method of claim 33 wherein the output terminal is selected from a group consisting of a pin, a ball grid array, and a connector.

40. The method of claim 33 wherein the feedback terminal is selected from a group consisting of a pin, a ball grid array, and a connector.

41. The method of claim 36 further comprising monitoring the feedback signal to detect an electrically degraded connection between the feedback terminal and the regulated output voltage.

42. The method of claim 41 wherein the power output has an amplitude; and
   wherein the electrically degraded connection is defined as having an increased impedance that causes the feedback signal to be of insufficient quality for the voltage regulator to control the amplitude of the power output.

43. The method of claim 42 wherein the electrically degraded connection is selected from a group consisting of a cold solder joint, the feedback conductor being partially disconnected from the regulated output voltage, and the feedback conductor being completely disconnected from the regulated output voltage.

44. The method of claim 41 wherein the monitoring the feedback signal includes comparing a voltage on the feedback terminal to a reference voltage to detect the electrically degraded connection.

45. The method of claim 33 wherein the receiving the feedback signal further includes receiving the feedback signal through redundant paths including at least two feedback terminals.

46. The method of claim 45 further comprising filtering the power output to generate a regulated output voltage; and
   coupling redundant feedback conductors between the regulated output voltage and the at least two feedback terminals of the integrated circuit to conduct the feedback signal.

47. The method of claim 45 further comprising interconnecting the at least two feedback terminals.

48. The integrated circuit of claim 1 wherein the voltage generator is a source type selected from a group consisting of an AC source and a DC source.

49. The integrated circuit of claim 17 wherein the means for voltage generating is a source type selected from a group consisting of an AC source and a DC source.

50. The integrated circuit of claim 1 wherein the voltage regulator decreases said DC voltage amplitude based on said pull-up voltage.

51. The integrated circuit of claim 1 wherein said pull-up resistor directly couples said voltage generator to said feedback terminal.

52. An integrated circuit comprising:
   a voltage regulator that has an output terminal and a feedback terminal, wherein said voltage regulator generates an output voltage at said output terminal based on a feedback signal received via said feedback terminal; and
   a voltage generator circuit in communication with said feedback terminal and that generates a pull-up voltage, wherein said voltage regulator decreases said output voltage based on said pull-up voltage.

53. The integrated circuit of claim 51 wherein said feedback signal is adjusted by said pull-up voltage.

54. The integrated circuit of claim 51 wherein said voltage generator circuit applies said pull-up voltage to said feedback terminal.

55. The integrated circuit of claim 51 wherein said voltage generator circuit generates said pull-up voltage based on an electrically degraded connection.

56. The integrated circuit of claim 51 comprising a feedback line coupled to said feedback terminal, wherein said voltage generator circuit generates said pull-up voltage based on increased impedance of said feedback line.

57. The integrated circuit of claim 51 wherein said voltage generator circuit generates said pull-up voltage having an amplitude greater than said output voltage.

58. The integrated circuit of claim 51 further comprising a feedback monitor that compares said feedback signal to a reference voltage and generates a degraded signal based on said comparison, wherein said voltage regulator adjusts said output voltage based on said degraded signal.

59. The Integrated circuit of claim 1 wherein said voltage generator generates said pull-up voltage based on detection of a degraded feedback line.

60. The integrated circuit of claim 1 wherein the output voltage Is a predetermined voltage level.

61. The Integrated circuit of claim 1 wherein the voltage generator generates the pull-up voltage when a decrease In voltage of the power output is detected.

62. The Integrated circuit of claim 1 wherein the voltage generator generates the pull-up voltage when an Impedance of a feedback line corresponding to the feedback terminal increases.

63. The integrated circuit of claim 1 wherein the voltage generator generates the pull-up voltage when degradation of a feedback line corresponding to the feedback terminal is detected.

64. The integrated circuit of claim 1 wherein the voltage generator generates the pull-up voltage when the feedback signal is not received by the voltage regulator.

* * * * *

UNITED STATES PATENT AND TRADEMARK OFFICE
CERTIFICATE OF CORRECTION

PATENT NO. : 7,514,911 B2  Page 1 of 1
APPLICATION NO. : 10/846717
DATED : April 7, 2009
INVENTOR(S) : Sehat Sutardja It is certified that error appears in the above-identified patent and that said Letters Patent is hereby corrected as shown below:

| | |
|---|---|
| Column 5, Line 44 | Delete "any" and insert -- array -- |
| Column 5, Line 47 | Delete "any" and insert -- array -- |
| Column 9, Line 11 | Delete "Integrated" and insert -- integrated -- |
| Column 9, Line 15 | Delete "Is" and insert -- is -- |
| Column 10, Line 1 | Delete "Integrated" and insert -- integrated -- |
| Column 10, Line 4 | Delete "Integrated" and insert -- integrated -- |
| Column 10, Line 5 | Delete "Impedance" and insert -- impedance -- |

Signed and Sealed this

Sixteenth Day of June, 2009

JOHN DOLL
*Acting Director of the United States Patent and Trademark Office*